April 4, 1961 A. H. RANEY 2,978,000
SAW CHAIN HAVING CUTTER INSERTS
Filed June 15, 1959 2 Sheets-Sheet 1

INVENTOR.
ARTHUR H. RANEY
BY
BUCKHORN, CHEATHAM & BLORE

ATTORNEYS

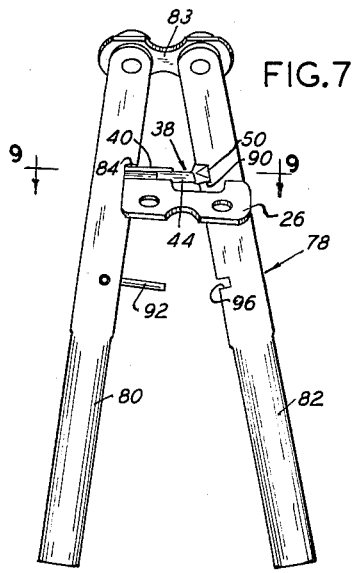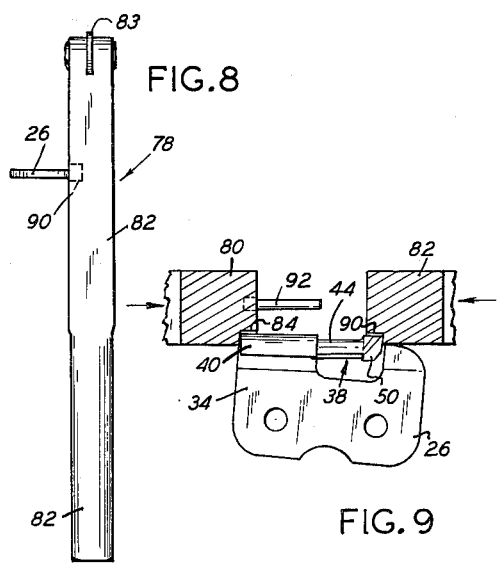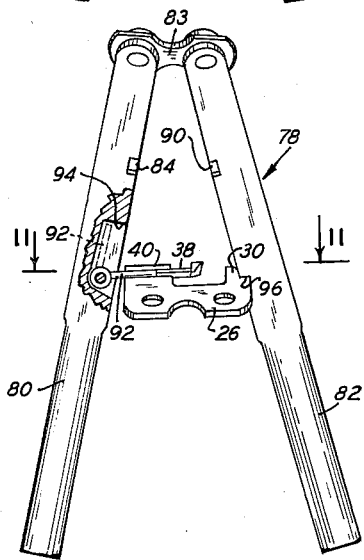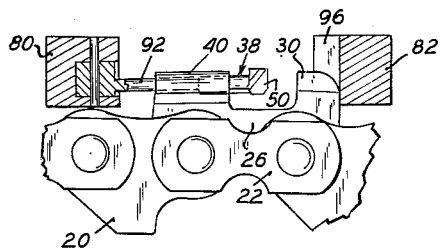
INVENTOR.
ARTHUR H. RANEY
BY
BUCKHORN, CHEATHAM & BLORE
ATTORNEYS

United States Patent Office 2,978,000
Patented Apr. 4, 1961

2,978,000
SAW CHAIN HAVING CUTTER INSERTS
Arthur H. Raney, Dunedin, Fla., assignor to Omark Industries, Inc., Portland, Oreg., a corporation of Oregon Filed June 15, 1959, Ser. No. 820,505
6 Claims. (Cl. 143—135)

This invention relates to a saw chain having cutter inserts and more particularly to a saw chain having cutter link plates provided with cutter inserts which can be easily removed and replaced and which are securely held in position on such cutter link plates.

Various attempts have been made to provide saw chains for wood cutting chain saws in which the cutter elements are releasably attached to the links of the chain so that such cutter elements can be replaced when dull or broken. Such chains have, in general, been of bulky or complicated construction and so far as applicant is aware, saw chains having cutter links with replaceable cutter elements have not been employed to any considerable extent commercially.

In accordance with the present invention, a saw chain is provided which may be largely fabricated of link plates which are the same or very similar to the link plates of saw chains now in widespread commercial use but which has cutter link plates thereof modified to enable cutter elements to be inserted and withdrawn from cutter carrying portions thereof by relative movement with respect to such link plates longitudinally of such link plates. The cutter element of each cutter link plate is held securely in position in a longitudinally extending socket in a cutter carrying portion of such link plate so that the stresses applied to the cutter element during a sawing operation hold such cutter element in the socket referred to. The cutter element has a shank received in such socket and an enlarged head provided with chisel cutting edges including a side cutting edge and a top cutting edge, both having proper relief and the cutter element is prevented from rotating in its socket so that such cutting edges are maintained rigidly in proper alignment on the cutter link plate. The cutter link plates also preferably include depth gauges spaced forwardly of such link plates from the cutting edges of the cutter element.

The cutter element is easily removed from and replaced in the cutter carrying portion of the cutter link by employing a suitable tool. Such tool may be light in weight and of simple construction and may be employed to push the shank of the cutter element into position in the socket in the cutter link plate or alternatively to push the cutter member out of such socket. The removing and replacing operations may be rapidly and easily performed and either a single cutter element may be removed or replaced when damaged or worn, or all the cutter elements of a saw chain may be removed or replaced in a relatively short time. The cutter elements will ordinarily be of wear resistant material, such as tool steel or a hard wear resistant alloy such as tungsten carbide, or the like. If desired, the cutting portion of such cutting element may be of such alloy and the shank may be of less brittle material, such as steel welded or brazed thereto.

It is therefore an object of the invention to provide an improved saw chain having replaceable cutter elements carried by cutter link plates.

Another object of the invention is to provide a saw chain in which all of the link plates and other chain elements may be of known construction except the cutter link plates, such cutter link plates being modified to receive a replaceable cutter element which may be easily inserted or removed and which is held securely in position during use of the chain.

A further object of the invention is to provide a cutter link plate for a saw chain in which a longitudinally extending cylindrical socket is provided for receiving and holding the shank of a cutter element in a manner holding the cutting edges of such element rigidly in position in spaced relation to a depth gauge on such cutter link plate.

Other objects and advantages of the invention will appear in the following description thereof given in connection with the attached drawing of which:

Fig. 7 is a perspective view of a tool which may be employed for inserting and removing the cutter insert elements of Figs. 4 to 8, showing a cutter element being inserted into a cutter link plate;

Fig. 8 is a side view of the tool of Fig. 7 looking toward the left in Fig. 7;

Fig. 9 is a horizontal section on an enlarged scale of the tool of Figs. 7 and 8, taken on the line 9—9 of Fig. 7;

Fig. 10 is a view similar to Fig. 7 showing the tool being used to remove a cutter insert element from a saw chain cutter link plate; and Fig. 11 is a horizontal section of the tool on an enlarged scale taken on the line 11—11 of Fig. 1 and showing the tool being employed to remove a cutter insert from a cutter link plate forming part of a saw chain.

Figure 1:
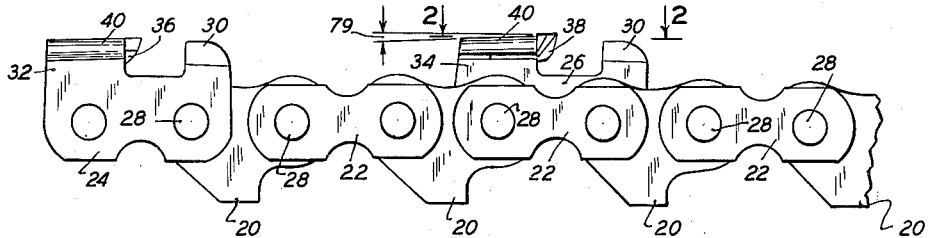
Fig. 1 is a side elevation of a saw chain in accordance with the present invention, the chain being shown in the position it would occupy on the top of a saw bar.

Referring more particularly to the drawings, the saw chain shown in Fig. 1 includes a plurality of center drive link plates 20, all of which may be identical and a plurality of side link plates 22, all of which may also be identical. The chain also contains a plurality of right cutter link plates 24 and a plurality of left cutter link plates 26. Pairs of side link plates 22 are employed to connect alternate pairs of drive link plates 20 together and the other alternate pairs of center drive link plates 20 are connected together by one side plate 22 and one cutter link plate 24 or 26. The right and left cutter link plates 24 and 26 are allochiral and are alternately positioned on opposite sides of the saw chain. All of the various link plates are connected together at their ends by means of rivets 28 extending through apertures in the various link plates as is well known in saw chain construction.

Each cutter link plate 24 or 26 has a depth gauge 30 extending outwardly from the chain in the general plane of such cutter link plate and positioned at the forward end of the cutter link plate. Also, each cutter link plate 24 and 26 has a cutter carrying portion 32 or 34, respectively, extending outwardly from the rear end of the respective cutter link plate in the same general direction as the depth gauges 30 and such cutter carrying portions 32 and 34 have cutter insert elements 36 and 38, respectively, carried thereby. The cutter carrying portions 32 and 34 as well as the cutter insert elements 36 and 38 of the cutter link plates 24 and 26, respectively, are identical except for being allochiral and only one will be described, namely, the cutter carrying portion 34 and cutter insert 38 of the left cutter plate link 26.

Figure 2:
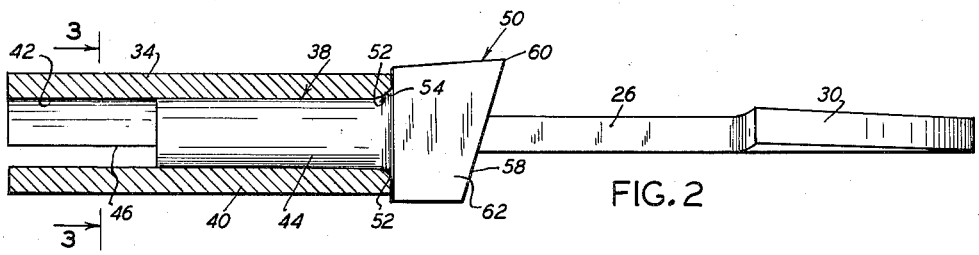
Fig. 2 is a sectional view on an enlarged scale taken on the line 2—2 of Fig. 1, showing the replaceable cutter insert element of the chain of Fig. 1 in top plan.
Figure 3:
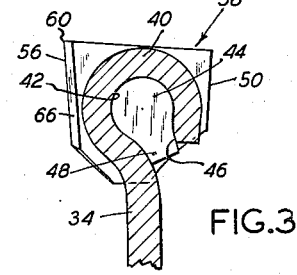
Fig. 3 is a fragmentary vertical section taken on line 3—3 of Fig. 2.

One of the cutter link plates 26 is shown in Fig. 2 with the cutter carrying portion 34 in approximately horizontal section to show the cutter insert element 38 in top plan view. As shown most clearly in Fig. 3, the cutter carrying portion 34 has its free end, which is its end most remote from the body of the cutter link plate 26, reduced in thickness and bent backwardly to provide a hollow cylindrical cutter insert receiving member 40 having an internal substantially cylindrical socket 32. The socket 42 receives the shank 44 of the cutter insert 38, which shank has a cylindrical portion fitting the socket 42. The cutter insert receiving member 40 has its terminal edge spaced from the body of the cutter link plate 34 to provide a slot 46 extending through the wall of the socket 42 and running longitudinally of the member 40 for its full length. The slot 46 is adjacent the juncture between the cutter receiving member 40 and the cutter carrying portion 34 and shank 44 of the cutter insert 38 has a longitudinally extending ridge or key portion 48 received in and fitting the slot 46 to prevent rotation of the cutter insert element relative to the cutter carrying portion 34 of the link plate 26.

Figure 4:
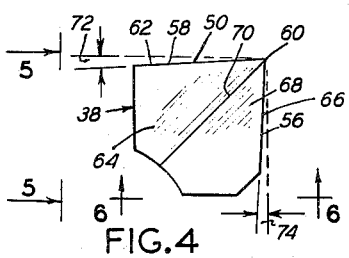
Fig. 4 is a front elevation of the cutter insert element of Figs. 1 to 3.
Figure 5:
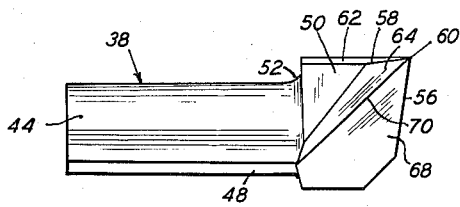
Fig. 5 is a side elevation of the cutter insert element of Fig. 4 looking to the right in Fig. 4.

The cutter insert 38 has an enlarged head 50 extending axially from one end of the shank 44 and connected thereto by a filleted shoulder 52 which abuts and fits the forward end of the insert receiving portion 40, such end of the portion 40 preferably having an internal chamfer 54 fitting the filleted shoulder 52. The head 50 of the cutter element 38 has a side slitting chisel edge 56 on its side opposite the ridge 48 on the shank 44 and has a top cutting chisel edge 58, the two edges 56 and 58 meeting at a sharp point or corner 60. As will be apparent from Fig. 5, the side slitting edge 56 is inclined so as to extend downwardly and rearwardly from the corner 60 to give a slicing action and similarly the top cutting edge 58 is inclined so as to extend laterally and rearwardly from the point 60 to also give such a slicing action. The top cutting edge 58 is formed by the intersection of a top plane 62 (Fig. 2) and a front top beveled plane 64 (Fig. 4). Similarly the side slitter edge 56 is formed by the intersection of a side plane 66 (Fig. 3) and a front side beveled plane 68. The two front beveled planes 64 and 68 provide a V-shape groove in the front face of the cutter and intersect in a line 70 at the bottom of such V-shaped groove.

Figure 6:
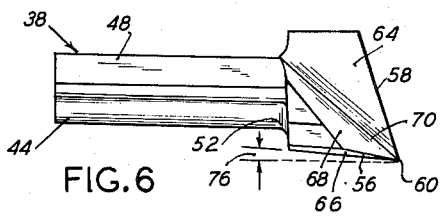
Fig. 6 is a bottom plan view of the cutter insert element of Fig. 4.

As shown most clearly in Fig. 4, the top plane 62 and side plane 66 intersect at an angle which is less than a right angle. That is to say, the top plane 62 is inclined so as to extend laterally and a small distance downwardly from the intersection referred to so as to provide a clearance angle indicated at 72 in Fig. 4, and the side plane 66 is inclined so as to extend downwardly and a small distance inwardly from such intersection to provide a clearance angle indicated at 74 in Fig. 4. Also, the side plane 66 is inclined so as to extend rearwardly and inwardly a small distance to provide a clearance angle indicated at 76 in Fig. 6. The axes of the cutter receiving member 40 may be inclined so as to extend rearwardly a small distance and downwardly as indicated in Fig. 1 so that the top plane 62 of the head of the cutter insert element may be parallel to the axis of the shank 44 of the cutter insert and can still provide a clearance angle indicated at 79 in Fig. 1 for the top cutting edge 58. The entire cutter insert element 38 may be formed of a single material, such as any suitable hard alloy or may have a head 50 of such alloy suitably welded or brazed to a shank 44 of more ductile metal.

It will be apparent that the cutter element 38 may be removed from the cutter receiving member 44 by rela-
tive motion longitudinally of the shank 44. Also, such cutter element 38 may be inserted in the cutter receiving member in the first instance by such a longitudinal motion in the opposite direction. In Fig. 7, a tool 78 for inserting and removing such cutter elements is illustrated. Such tool may have a pair of similar handle portions 80 and 82 suitably pivoted together at one end by a link 83. In Fig. 7, the tool is shown as being employed to insert a cutter element 38 into the socket of a cutter receiving member 40 of a cutter link plate 26. As shown in such figure, a notch 84 in the handle 80 engages the rear end of the cutter receiving member 40 and a notch 90 in the other handle 82 engages the head 50 of the cutter element 38. By aligning the shank 44 of the cutter element with the front end of the socket in the cutter receiving member 40 and engaging the rear end of such cutter receiving member in the notch 84 and also engaging the head 50 of the cutter element 38 in the notch 90, the cutter member may be pushed into the socket in the cutter receiving member 40 by moving the handles 80 and 82 toward each other.

The same tool may be employed for removing a cutter insert element 38 from the cutter receiving member of a cutter link plate 26 as illustrated in Fig. 10. The handle 80 of the tool 78 may also be provided with a pin 92 pivotally mounted in a socket or recess 94 in the handle 80 and capable of being moved from the inactive dotted line position shown in Fig. 10 to the active full line position also shown in such figure. The pin 92 may be inserted into the rear end of the socket in the cutter receiving member 40 and the front end or depth gauge portion 30 of the cutter link plate 26 may be engaged in another notch 96 in the handle 82 of the tool. It will be apparent that pressing the handles 80 and 82 together in Fig. 10 will slide the cutter member 38 out of the socket in the cutter receiving member 40. It will also be apparent that the tool of Figs. 7 to 11 inclusive, may be effectively employed to insert or withdraw cutter members from the cutter receiving member of the various cutter link plates and that such tool is light in weight so that it may be carried with the operator of a chain saw to enable him to easily and rapidly replace dull or broken cutter elements.

I claim:

1. A cutter link for a saw chain comprising an elongated side plate portion having an integral cutter carrying portion extending from said plate portion and curved back upon itself to provide a hollow cutter element receiving member having a longitudinal axis generally parallel to the plane of said side plate portion and extending longitudinally of said plate portion, said cutter carrying portion terminating in an edge adjacent but spaced from said plate portion for at least a major portion of the length of said member to provide a longitudinally extending slot adjacent said plate portion, and a cutter element having a shank received in and fitting the interior of said member including a rib extending longitudinally of said shank and received in and fitting said slot, said cutter element having a cutter head on one end of said shank providing a shoulder abutting against one end of said member and provided with cutting edges directed away from said member.

2. A cutter link for a saw chain comprising an elongated side link plate portion having an integral cutter carrying portion extending from said plate portion and curved back upon itself to provide a hollow cylindrical member having a longitudinal axis generally parallel to the plane of said plate portion and a cylindrical socket extending longitudinally of said plate portion, said cutter carrying portion terminating in an edge adjacent but spaced from said plate portion for at least a major portion of the length of said member to provide a longitudinally extending slot adjacent said plate portion, and a cutter element having a shank received in and fitting said cylindrical socket including a rib extending longitudinally of said shank and received in and fitting said slot, said cutter element having a cutter head on one end of said shank abutting against one end of said member and provided with cutting edges directed away from said member.

3. A cutter link for a saw chain comprising an elongated side link plate portion having an integral cutter carrying portion extending from said plate portion and curved back upon itself to provide a hollow cylindrical member having a longitudinal axis generally parallel to the plane of said plate portion and a cylindrical socket extending longitudinally of said plate portion, said cutter carrying portion terminating in an edge adjacent but spaced from said plate portion throughout the length of said edge and said member, and a cutter element having a shank received in and fitting said cylindrical socket including a rib extending longitudinally of said shank and received in and fitting said slot, said cutter element having a cutter head on one end of said shank abutting against one end of said member and provided with chisel cutting edges directed away from said member.

4. A cutter link for a saw chain comprising an elongated side link plate portion having an integral cutter carrying portion extending from said plate portion and curved back upon itself to provide a hollow cylindrical member having a longitudinal axis generally parallel to the plane of said plate portion and a cylindrical socket extending longitudinally of said plate portion, said cutter carrying portion terminating in an edge adjacent but spaced from said plate portion for at least a major portion of the length of said member to provide a longitudinally extending slot adjacent said plate portion, said cutter element having a cutter head on one end of said shank abutting against one end of said member and provided with cutting edges directed away from said member, a depth gauge extending from said plate in advance of said cutter carrying portion and spaced from said portion to provide for removing and replacing said element.

5. A saw chain comprising longitudinally extending center and side link plates pivotally connected together at their ends, certain of said link plates being cutter link plates, each said cutter link plate having a side plate portion and an integral cutter carrying portion extending outwardly from the rear end of said plate portion and a depth gauge portion extending outwardly from the forward end of said plate portion and spaced longitudinally of said plate portion from said cutter carrying portion, said cutter carrying portion being curved back upon itself to provide a hollow cylindrical member extending longitudinally of said plate portion, said cutter carrying portion terminating in an edge adjacent but spaced from said plate portion to provide a slot extending longitudinally of said member adjacent said plate portion at one side of said cutter carrying portion, a cutter element having a shank received in and fitting said hollow cylindrical member including a ridge extending longitudinally of said shank received in and fitting said slot, said element having an enlarged head at one end abutting the forward end of said member and having a side chisel cutting edge and a top chisel cutting edge directed toward the forward end of said cutter link plate, said cutter element being removable and replaceable in said member by movement longitudinal of said member, and said depth gauge being spaced from said member to provide for removing and replacing said element.

6. A saw chain comprising longitudinally extending center and side link plates pivotally connected together at their ends, certain of said link plates being cutter link plates, each said cutter link plate having a side plate portion and an integral cutter carrying portion extending outwardly from the rear end of said plate portion and a depth gauge portion extending outwardly from the forward end of said plate portion and spaced longitudinally of said plate portion from said cutter carrying portion, said cutter carrying portion being curved back upon itself to provide a hollow cylindrical member extending longitudinally of said plate portion, said cutter carrying portion terminating in an edge adjacent but spaced from said plate portion to provide a slot extending longitudinally of said member adjacent said plate portion at one side of said cutter carrying portion, a cutter element having a shank received in and fitting said hollow cylindrical member including a ridge extending longitudinally of said shank received in and fitting said slot, said element having an enlarged head at one end abutting the forward end of said member and having a V-shaped slot in its front surface having side walls intersecting the side and top surfaces of said head to provide a side chisel cutting edge and a top chisel cutting edge directed toward the forward end of said cutter link plate, said cutter element shank being removable and replaceable in said socket by movement longitudinal of said member, and said depth gauge being spaced from said member to provide for removing and replacing said element.

References Cited in the file of this patent
UNITED STATES PATENTS

| | | |
|---|---|---|
| Re. 24,129 | Hassler | Mar. 13, 1956 |
| 482,033 | Atkinson | Sept. 6, 1892 |
| 2,534,591 | Geurian | Dec. 19, 1950 |
| 2,736,352 | Wright | Feb. 28, 1956 |
| 2,746,494 | Cox | May 22, 1956 |